United States Patent
Hansen (10) Patent No.: US 7,762,306 B2
(45) Date of Patent: Jul. 27, 2010

(54) ROLL-UP SHADE DRIVE WITH SPRING MOTOR AND REDUCED DRIVE FORCE

(75) Inventor: Melf Hansen, Gondelsheim (DE)

(73) Assignee: BOS GmbH & Co. KG, Ostfildern (DE)

( * ) Notice: Subject to any disclaimer, the term of this patent is extended or adjusted under 35 U.S.C. 154(b) by 222 days.

(21) Appl. No.: 11/904,575

(22) Filed: Sep. 27, 2007

(65) Prior Publication Data

US 2008/0078513 A1    Apr. 3, 2008

(30) Foreign Application Priority Data

| Sep. 27, 2006 | (DE) | ................ | 10 2006 046 064 |
| Sep. 27, 2006 | (DE) | ................ | 10 2006 046 065 |
| Sep. 27, 2006 | (DE) | ................ | 10 2006 046 069 |
| Oct. 13, 2006 | (DE) | ................ | 10 2006 049 065 |
| Nov. 13, 2006 | (DE) | ................ | 10 2006 053 680 |

(51) Int. Cl.
*B60J 3/02* (2006.01)

(52) U.S. Cl. .............. 160/370.22; 160/265; 296/97.8

(58) Field of Classification Search ......... 160/370.22, 160/265, 274; 296/97.8
See application file for complete search history.

(56) References Cited

U.S. PATENT DOCUMENTS

| 5,201,810 | A  | * | 4/1993  | Ojima et al. ............. 160/265 |
| 5,560,668 | A  | * | 10/1996 | Li ........................ 296/97.8 |
| 6,257,305 | B1 | * | 7/2001  | Mullet et al. ............ 160/310 |
| 2005/0061454 | A1 | * | 3/2005 | Chen ................. 160/370.22 |
| 2005/0121152 | A1 | * | 6/2005 | Weinbrenner ......... 160/370.22 |
| 2008/0179024 | A1 | * | 7/2008 | Fichter et al. ......... 160/370.22 |

FOREIGN PATENT DOCUMENTS

| DE | 3608927 A1      | 9/1987  |
| DE | 29921859 U1     | 7/2000  |
| DE | 19914543 A1     | 10/2000 |
| DE | 20021488 U1     | 4/2002  |
| DE | 10055949 A1     | 5/2002  |
| DE | 203 09 690 U1   | 9/2003  |
| DE | 202004019785 U1 | 3/2005  |
| DE | 102004038756 A1 | 2/2006  |
| DE | 10 2004 036 392 | 3/2006  |
| EP | 1 243 474 A     | 9/2002  |
| EP | 1 645 448 A     | 4/2006  |
| JP | 11 286823 A     | 10/1999 |

OTHER PUBLICATIONS

Official Action from German Patent Office dated Jun. 19, 2009 in German counterpart application 10 2006 046 065.0-56.

* cited by examiner

*Primary Examiner*—Blair M. Johnson
(74) *Attorney, Agent, or Firm*—Leydig, Voit & Mayer, Ltd.

(57) ABSTRACT

A roll-up window shade for motor vehicle windows is provided that has guide rails running at the side of the extended shade element. A linear push element is provided for each guide rail. Each push element is driven by a separate gear. Therefore, complicated guide tubes, which among other problems generate a lot of friction, are eliminated. A trunk cover has a guide rail on each side of the shade element. For driving the shade element, a push element is provided for each guide rail. The push element is constructed as a non-endless drive element. Each push element is driven by a separate motor and a separate gear. Electrical synchronization of the motors is not provided.

17 Claims, 7 Drawing Sheets

ROLL-UP SHADE DRIVE WITH SPRING MOTOR AND REDUCED DRIVE FORCE

FIELD OF THE INVENTION

The present invention relates to roll-up window shades for motor vehicles

BACKGROUND OF THE INVENTION

Electrically driven roll-up rear window shades are known in the prior art. These prior art roll-up window shades a wind-up shaft that is supported rotatably underneath the rear-window shelf and to which one edge of the shade element. The other edge of the shade element is connected to a pull rod that is guided on its ends in guide rails. The guide rails run next to the side edges of the rear window, starting from the rear-window shelf or underneath the shelf up to the vicinity of the top edge of the window. To bias the shade element, a spring motor that biases the wind-up shaft in a wind-up direction of the shade element is usually arranged in or next to the wind-up shaft.

The unwinding or tensioning of the shade element is performed with the help of linear push elements that are guided in a buckle-free manner in the groove chamber of the guide rails. For driving the push elements, a common geared motor is provided. The geared motor lies next to the wind-up shaft approximately at the height of its center. To connect the geared motor to the bottom end of the guide rails, guide tubes are provided that end on the gear housing of the geared motor. With the help of these guide tubes, the push elements are guided in a buckle-free manner between the drive motor and the guide rails so that they can perform the pushing function.

Because the motor sits relatively closely next to the wind-up shaft due to space considerations, the guide tubes extend approximately parallel to the wind-up shaft in the vicinity of the geared motor and must be deflected in a direction perpendicular to the wind-up shaft for the guide rails. In turn, the radius of curvature of the guide tubes is comparatively very narrow next to the opening into the guide rails also because of space reasons.

Practice has shown that with such roll-up shades the predominant part of the driving force delivered by the geared motor is absorbed by the push elements in the guide tubes. Only a comparatively small portion of the force delivered by the motor is actually needed for extending the roll-up shade.

The guide tubes have, in general, a relatively complicated, three-dimensional shape. Thus, their production and adaptation to the vehicle conditions is complicated. In addition, the push elements lying behind the motor must also be protected. The length of this part of the push element extending past the motor depends on the distance the roll-up shade extends. The push element extends the least when the roll-up shade is extended, while the projection is the greatest when the roll-up shade is completely retracted. Because the amount of travel is typically larger than half the width of the wind-up shaft, the storage tube holding the excess part must also be adapted in a complicated three-dimensional way to the space requirements of the vehicle. Thus, the roll-up window shade is not only complicated to manufacture, it is also difficult to install in the vehicle.

The problems with the known designs have been described in connection with a roll-up rear-window shade. Similar problems are with roll-up sunroof shades that are driven in a comparable way.

The high friction losses of the push elements into the guide and storage tubes also make the design and dimensioning of an electric based pinch protection system, which is based on the measurement of the motor current, considerably more difficult. Depending on the magnitude of the friction losses, more or less power is available for a given turn-off current to clamp or squeeze body parts.

OBJECTS AND SUMMARY OF THE INVENTION

In view of the foregoing, a general object of the present invention is to provide a roll-up window shade for motor vehicles having a drive with lower friction losses.

The roll-up window shade of the present invention includes a rotatably supported wind-up shaft having two ends. A first edge of the shade element is attached to the wind-up shaft. The other second edge of the shade element is connected to a pull rod having ends that run in guide rails. The guide rails extend on both sides of the shade element when it in the extended position and define the path that the pull rod covers from the retracted to the extended position.

The pull rod is driven with the help of two push elements. Each of the two push elements is allocated to and guided by a corresponding guide rail. The two push elements interact with the ends of the pull rod so as to be able to advance the pull rod away from the wind-up shaft.

For driving the push elements, a separate drive gear is provided for each push element. The drive gears sit locked in rotation on a common drive shaft and can be provided adjacent the foot end of the guide rails (i.e., in the vicinity of the wind-up shaft). In this way, a significant or longer piece of guide tube is eliminated between the foot end of the guide rails and the drive gear. The push element projecting from the corresponding guide rail can run practically directly into a gear housing that is provided adjacent to the foot end of the guide rail. In this way, the connection tubes that are typically used in prior art designs can be eliminated.

Eliminating the connection tubes saves drive force in a couple of respects. First, the drive force that is necessary to move the corresponding length of push element through an optional, straight guide tube is eliminated. Second, friction force is saved because the curved shape of the connection tube is eliminated. The curved shape can cause significantly increased friction on the push element in the connection tube. The drive force delivered by the motor is now available exclusively for moving the roll-up shade. The friction force generated by the push elements in the guide rails is comparatively small and can be easily calculated because the guide rails are nearly straight.

For driving the roll-up shade, an electric drive motor is provided. The drive motor drives, e.g., the wind-up shaft. The connection shaft is driven by means of a spring motor, as known from prior roll-up shades. The inverse driving arrangement also possible, i.e., the spring motor is coupled with the wind-up shaft and the electric motor is coupled with the connection shaft.

With the present invention, because there is no three-dimensional deflection of the push element, a push element can be used that has teeth on only one side or that has teeth all around. The all-around teeth can enable positioning of the push element in the guide rail or the arrangement through a kind of helical motion. Through the helical motion, the push element is "screwed along" the stationary drive gear.

According to the particular vehicle body, the push elements can either run freely in the vehicle body or storage tubes composed of a flexible material can be provided to hold the slack section. The storage tubes can be placed freely in the car body and do not need to be pre-formed by the roll-up window shade manufacturer. The pull rod can have a variable length depending on the geometry of the window.

To guide the push elements in a buckle-free manner, using guide rails containing an undercut guide groove is advantageous. Such an undercut guide groove can comprise in cross-section a groove chamber and a groove slot.

It can be useful if the push elements have teeth all-around. The connection shaft can run outside and parallel to the wind-up shaft or through the wind-up shaft. With one embodiment, the necessary space is somewhat larger, thus the assembly is somewhat easier.

The spring motor can be formed by a helical or spiral spring. The spring motor can be located within the wind-up shaft, can surround the connection shaft or can be arranged next to and parallel to both.

For holding the slack section of the push element, storage tubes can be provided. These can be made from a flexible material so that they can be placed freely in the car body.

From the described inventive concept, a trunk cover can also be constructed. Trunk covers have the problem that after removing the housing for the shade element there can be absolutely no connection between the guide rails. Accordingly, there have been a series of attempts to provide a trunk cover that is activated electrically while simultaneously dealing with this problem. For example, an electrically activated trunk cover is described in EP 1 243 474 B1. This trunk cover includes a housing in which a wind-up shaft is rotatably supported. One edge of the shade element is fixed to the wind-up shaft. The opposite end of the shade is connected to a pull rod or a contour part. The ends of the pull rod run in guide rails. The guide rails extend underneath the rear side windows at the side of the trunk space.

Two motors are provided within the housing that drive gears supported rotatably next to the ends of the housing. The gears are used to move perforated bands. Each perforated band is connected in a tension and compression-fixed way to one end of the pull rod running in the guide rails. The perforated bands are not constructed as endless bands (i.e., they have two ends that are not connected to each other). One of these ends is attached to the pull rod.

In this way a slack section is produced that must be significantly tensioned for an opened trunk cover. For this purpose, the housing contains storage channels running parallel to the wind-up shaft. The profile that the perforated band follows in the area of the storage channel is curved in a very complicated, multi-dimensional manner.

Prior experience with this construction has not been satisfactory because a very flexible perforated band that is not sufficiently resistant to shearing must be used due to the multi-dimensional curved profile. For spreading out the shade element, a compressive force must be exerted on the pull rod by the perforated band. Because of its insufficient stiffness, the perforated band tends to compress in the guide rails like an accordion, producing considerably increased friction in the guide rail.

Based on this, another aspect of the present invention is creating a trunk cover for motor vehicles that is not subject to these problems. With the novel trunk cover, a rotatably mounted wind-up shaft is provided. One edge of the shade element is attached to the wind-up shaft. The other edge is anchored to a pull rod, which also could be formed as a contour part in a known manner. Two guide rails extend on both sides of the shade element. At the sides, the guide rails limit the top opening through which access is made to the trunk. Typically, the guide rails lie underneath the rear side windows in narrow side brackets, which close the gap between the straight guide rails and the typically cambered inner shape of the car body.

For activating the pull rod, two non-endless push elements are provided (i.e., the ends of the push element are not connected to each other). A drive wheel with a positive fit drives each push element. This drive wheel divides the push element into a work section and a slack section. The work section runs in the same guide groove of the guide rail in which the pull rod slides. In contrast, the slack section is held by a tube, which is formed underneath the guide groove in the guide rail. This tube runs parallel to the guide groove. If necessary, the storage tube also can be formed as a groove integrated into the guide rail.

A separate gear motor, which is fixed to the car body, is allocated to each of the two drive gears. Because of this arrangement, the housing with the wind-up shaft is completely passive. In contrast, the electrical drive motors are fixed to the car body and electrical connections between the vehicle and the housing are eliminated.

Furthermore, each push element is deflected about only one axis. A complicated, multi-dimensional deflection is not necessary. In this way, a relatively stiff push element can be used. In particular, it is no longer necessary to use drive gears with very small diameters to free space in the housing for the wind-up shaft. Relatively large gears can be used that can easily be located in the side lining of the trunk space. For these reasons, comparatively stiff push elements can be used, which do not tend to twist greatly and jam in the guide rail.

Because two separate drive motors are used, each drive motor can have a relatively very small and thus space-saving construction. Because the drive motors are housed outside the housing of the trunk cover, they no longer contribute to increasing the housing volume as with prior art designs. In this way, the trunk cover can be handled during removal much more easily because the weight is also reduced.

The push elements can typically have, as with the roll-up window shade, all-around teeth and are easily guided protected from buckling in the groove chamber of the guide groove. A variable-length pull rod can also be used, for example, for car body shapes in which the belt line runs slightly drawn-in starting from the rear doors in the direction of the tailgate.

To allow easy coupling of the push elements on the pull rod and to not limit the length of the wind-up shaft, it is useful if the drive wheels for the push elements are arranged underneath the guide rails.

A simple forced synchronization of the otherwise mechanically non-synchronized and also electrically non-synchronized motors can be achieved if the push elements are provided with mechanical stops that limit the working travel. The permanently excited motors that are typically used produce motor speeds that deviate only very slightly due to production tolerances. If the motors are started simultaneously, the push elements reach the end of their work travel almost simultaneously. The time drift is very small.

Because they run against a positive-fit stop at the end of their work travel, they are also re-synchronized with positive locking without other complicated mechanical synchronization or electrical synchronization being performed, which would force synchronized movement during the work travel. According to the invention, the motors can run completely unsynchronized during the work travel. Synchronization takes place only at the end of the work travel.

The following description of preferred embodiments of the invention is limited to an explanation of the aspects necessary for understanding the invention. It is clear that any number of modifications are possible. A person of ordinary skill in the art can infer minor details from the drawings that are not otherwise described.

The drawings are not to scale. In order to emphasize certain details, areas are shown enlarged. In addition, the drawings are simplified and do not contain every detail that might be present in a practical embodiment.

DESCRIPTION OF THE PREFERRED EMBODIMENTS

Figure 1:
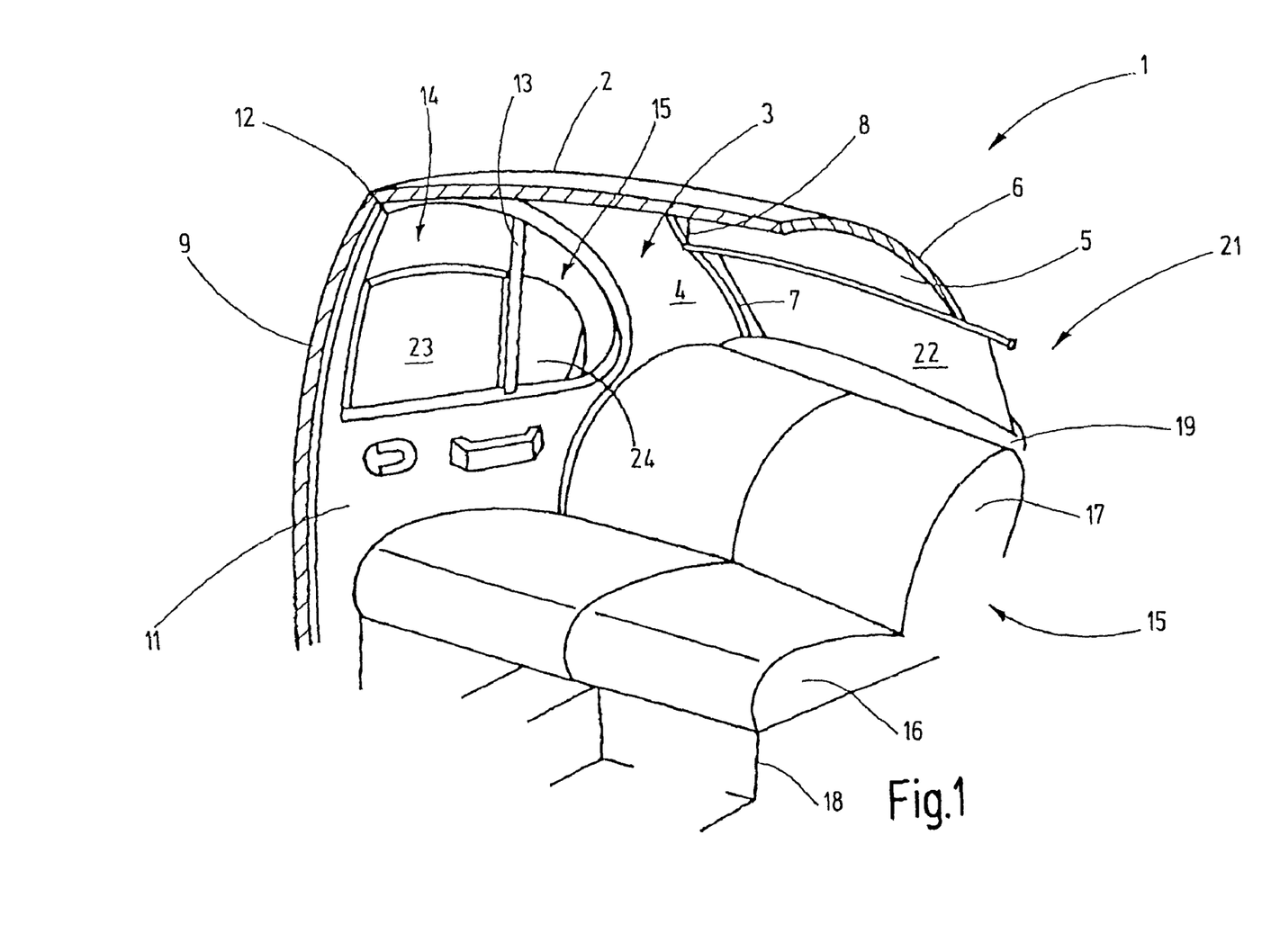
FIG. 1 is a partially cutaway perspective view of the rear passenger compartment of an exemplary motor vehicle equipped with a roll-up window shade according to the present invention.

Referring now to FIG. 1 of the drawings, the rear passenger compartment of an illustrative motor vehicle is shown. The right inside of the passenger compartment is shown in FIG. 1, which is the mirror-image of the not shown left side. Unless indicated otherwise herein, the description regarding the right inside also applies to the left inside of the car body. FIG. 1 is simplified; for example, internal car-body structures, the braces and the attachment elements are not shown, because they are not necessary for understanding the invention.

The illustrated car-body section 1 has a roof 2 and a C-pillar 3 that extends downward from the roof to a floor assembly. A corresponding C-pillar is on the left side of the vehicle. The inside of the C-pillar 3 is provided with a lining 4. The roof 2 transitions at its rear edge into a rear window 5. The rear window is bounded on the top side by a window top edge 6. Only one section 7 of the side edges can be seen in FIG. 1. The side edges extend towards each other in a mirror-symmetric way. The section 7 transitions at one corner region 8 into the window top edge 6.

The width of the rear window 5 is greater at the height of the belt line of the car body than in the region of the window top edge 6. A B-pillar 9 is located at a distance in front of the C-pillar 3. A rear right side door 11 is hinged on the B-pillar 9 in a known manner. The rear right side door 11 contains a window cut-out 12 that is divided into a substantially rectangular section 14 and an approximately triangular section 15 by a vertical brace 13.

A rear seat bench 15 with a rear seat sitting surface 16 and a rear seat backrest 17 are also provided. The rear seat sitting surface 16 is supported on the floor assembly 18. A rear seat shelf 19 extends between the rear top edge of the rear seat backrest 17 and the rear window 5.

According to the invention, the rear window 5 is equipped with a roll-up rear window shade 21 of which only a shade element 22 can be seen FIG. 1. Additional roll-up shades are provided on the side window 12, including a shade element 23 in the rectangular window section 14 and a shade element 24 in the triangular section 15. The drive of the shade elements 23 and 24 corresponds to the drive of the roll-up rear window shade 21. Accordingly, only the drive of the roll-up rear window shade will be described in detail.

Figure 2:
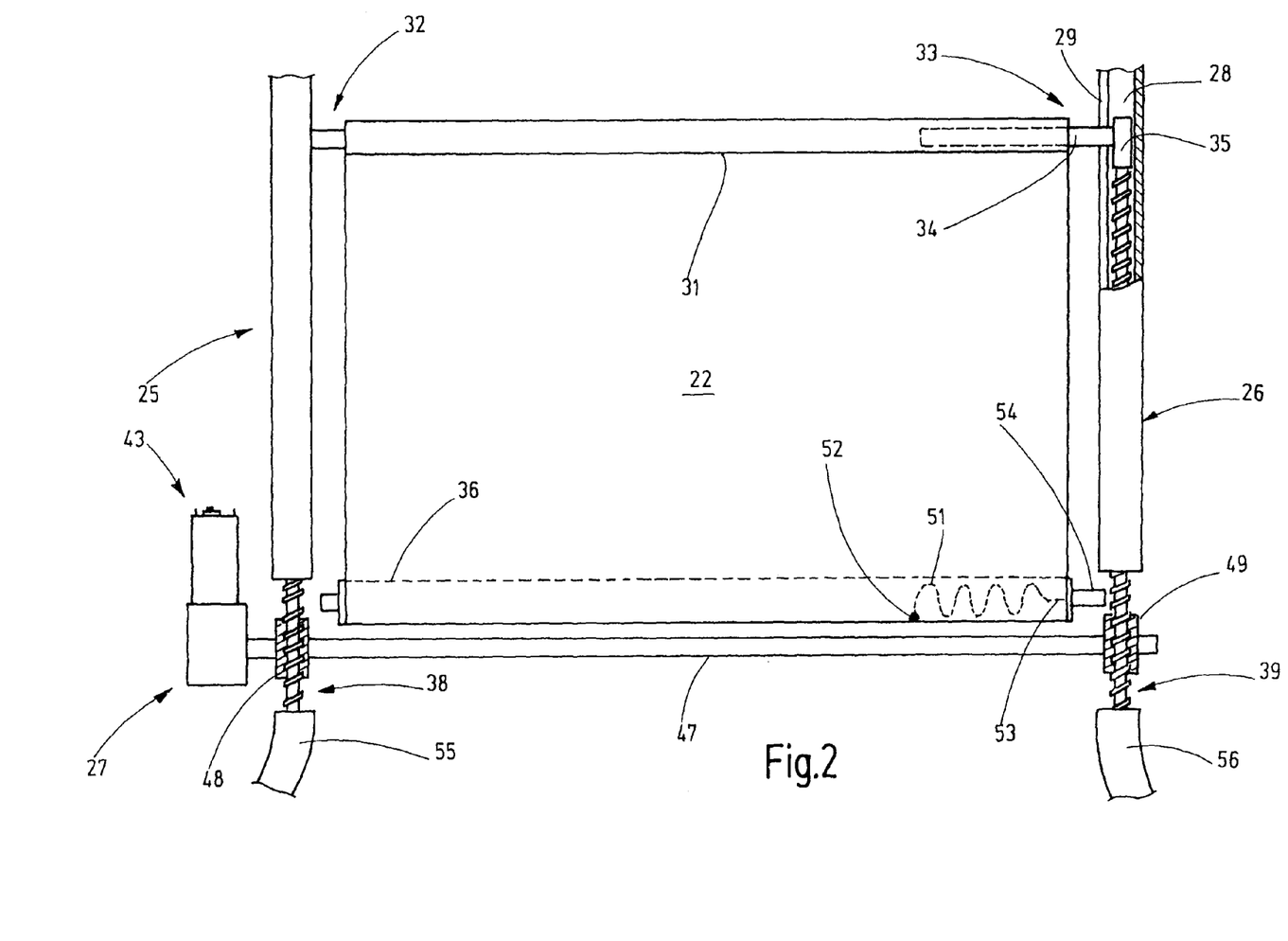
FIG. 2 is a partially cutaway front view of the roll-up window shade of FIG. 1.

As shown in FIG. 2, the roll-up rear window shade 21 includes two guide rails 25 and 26 that extend at the sides of the rear window 5 and a drive system 27. The guide rails 25 and 26 are arranged in a mirror-symmetric manner relative to each other and follow the profile of the side edge of the rear window 5. Unlike what is shown in FIG. 2, the guide rails converge more or less strongly as they extend towards the roof 2.

Because the two guide rails 25 and 26 have the same construction, it is sufficient to explain the inner structure of the guide rail 26. As will be appreciated, the explanation also applies to the guide rail 25.

An undercut guide groove 27, whose profile is composed from a groove chamber 28 and a groove slot 29, is located in the guide rail 26. The width of the slot 29 is smaller than the open width of the groove chamber 28, which produces the undercut structure. The two guide rails 25 and 26 are used to guide a pull rod 31, on which one edge of the shade element 22 is fixed. The pull rod 31 is composed of a middle piece, in which two end pieces 32 and 33 are guided in a telescoping manner. The middle piece sits in a hose-shaped loop formed on the shade element 22.

Each of the two end pieces 32 and 33 has a telescoping rod 34 with a sliding piece 35 sitting on its free end. The telescoping rod 34 is dimensioned in cross section so that it passes through the slot 29 with play. In contrast, the cross sectional configuration of the sliding piece 35 is adapted to the cross sectional configuration of the groove chamber 28, which has, for example, a circular cross section.

The end of the shade element 22 away from the pull rod 31 is fixed to a wind-up shaft 36. The drive device 27 moves the shade element 22 between an extended position in which it is spread in front of the rear window 5 and a retracted position, in which the pull rod 31 is either supported on the rear seat shelf 19 or is retracted through the slot in the rear shelf.

The drive device 27 includes two identical linear, elastically bendable push elements 38 and 39. Each of the push elements 38, 39 includes a core 41 with a circular cross section and a coil 42 fixed to the outside of the circular core 41. In this way, a type of all-around elastically bendable toothed rod is produced. The outside diameter of the push elements 38, 39 corresponds to the open width of the groove chamber 28. As a result, the two push elements 38, 39 are guided protected from buckling in their associated guide rails 25 and 26 and can transfer compression forces. Their diameter is greater than that corresponding to the slot width 29, so that they also cannot buckle to the side through the slot 29 under pressure loading. The drive device 27 further includes a gear motor 43, whose output shaft 44 is rigidly connected to a connection shaft 47. The connection shaft 47 runs next to and parallel to the wind-up shaft 36.

Two spur gears 48, 49 are locked in rotation with the connection shaft 47. Each of the spur gears 48, 49 is provided with teeth on the outer peripheral surface that allow a positive-fit engagement with the associated push elements 38, 39. The two push elements 38, 39 are pressed in the radial direction against the associated drive gear 48, 49 by an engagement element so that the engagement is continuous. The push elements 38, 39 contact the associated drive gear 48, 49, on which the shade element 22 also runs from the wind-up shaft 36, on the same side relative to the rotational axis. The drive gears/spur gears 48, 49 are located next to the ends of the wind-up shaft 36, in extended relation to the peripheral surfaces of the drive gears 48, 49.

The drive device 27 also includes a spring motor 51 in the interior of the tubular wind-up shaft 36. The spring motor 51 is constructed, for example, in the form of a helical spring. One end of the helical spring is locked in rotation with the wind-up shaft 36 at 52. The other end 53 is anchored on a rotationally fixed bearing journal 54, on which the wind-up shaft 36 is rotatably supported. The bearing journal 54 is anchored in the vehicle in a manner preventing rotation.

An elastically bendable storage tube 55 or 56, which can be freely placed in the vehicle corresponding based on the space condition, can be located on the opposite side of the associated gear 48, 49 relative to the corresponding guide rail 25, 26. The measures that are taken to hold the storage tubes 55 and 56 stationary are not important for understanding the invention. Likewise, a possible housing can be provided that surrounds the gear 48 or 49 and contains a corresponding tangential borehole for passing the associated elastically bendable push element 38, 39.

The figures are not to scale. Instead, they are intended to show the features of the novel drive concept necessary for understanding the invention. The dimensions of the guide rails 25, 26 and also the resulting outer diameters of the two elastically bendable push elements 38, 39 can be determined from practice.

The operation of the illustrated embodiment is as follows. In this case, the shade element starts in the retracted position. In this position, the shade element is wound completely on the wind-up shaft 36. The two push elements 38, 39 are pushed back sufficiently far into the storage tubes 55 and 56. The spring motor 51 generates a biasing tension that maintains fabric tension in the shade element 22.

Starting from the retracted position, if a user activates the drive motor 43, the two drive gears 48 and 49 are simultaneously set into rotation. The drive gears 48 and 49 carry along the push elements 38, 39 with a positive fit and force them in the direction of the guide rails 25, 26. As a result, the pull rod 31 is moved away from the wind-up shaft 36 due to the positive-fit interaction between the push elements 38, 39 and the sliding piece 35. The shade element 22 is tensioned in front of the rear window to the extent that the pull rod 31 is moved away from the wind-up shaft 36.

Obviously, the driving force applied by the drive motor 43 is limited to overcoming the biasing force of the spring motor 51 and delivering the force that is necessary to transport the two push elements 38, 39 along their path. Because the two push elements 38 and 39 experience practically no deflection, the friction force or friction force losses are extremely low. The two guide rails 25, 26 run nearly straight or with only a very slight curvature corresponding to the somewhat curved profile of, for example, the side edges of the rear window. A significant friction force is not produced in the two storage tubes 55, 56.

In the fully extended state, which is defined, for example, by positive-fit stops, the shade element 22 is completely extended. The spring motor 51 is drawn further out by a corresponding amount, approximately 10 rotations. For retracting, the gear motor 43 is set in motion in the opposite direction. In this way, the two push elements 38 and 39 are retracted from the guide rails 25, 26 and transported into the storage tubes 55, 56.

To the extent that the two push elements 38, 39 retract, the shade element 31 is rewound onto the wind-up shaft 36 under the effect of the spring motor 51 which generates a corresponding biasing force. When retracting, the pull rod 31 directly follows the retracting movement of the two push elements 38, 39. As will be appreciated, the gear motor 43 acts together with the helical spring 51 or the spring motor as a drive device.

Unlike what is shown in FIG. 2, the spring motor can be easily arranged coaxial to the connection shaft 47, with the connection shaft 47 being led through the helical spring 51 while the wind-up shaft 36 is driven by the gear motor 43. The operation is the same as has been described. The difference is that the wind-up shaft, which is set in motion by the gear motor 43, sets and defines the extension travel, while the fabric tension is generated with the help of the push elements 38, 39 and the spring motor 51 now coupled with the connection shaft 47.

Figure 3:
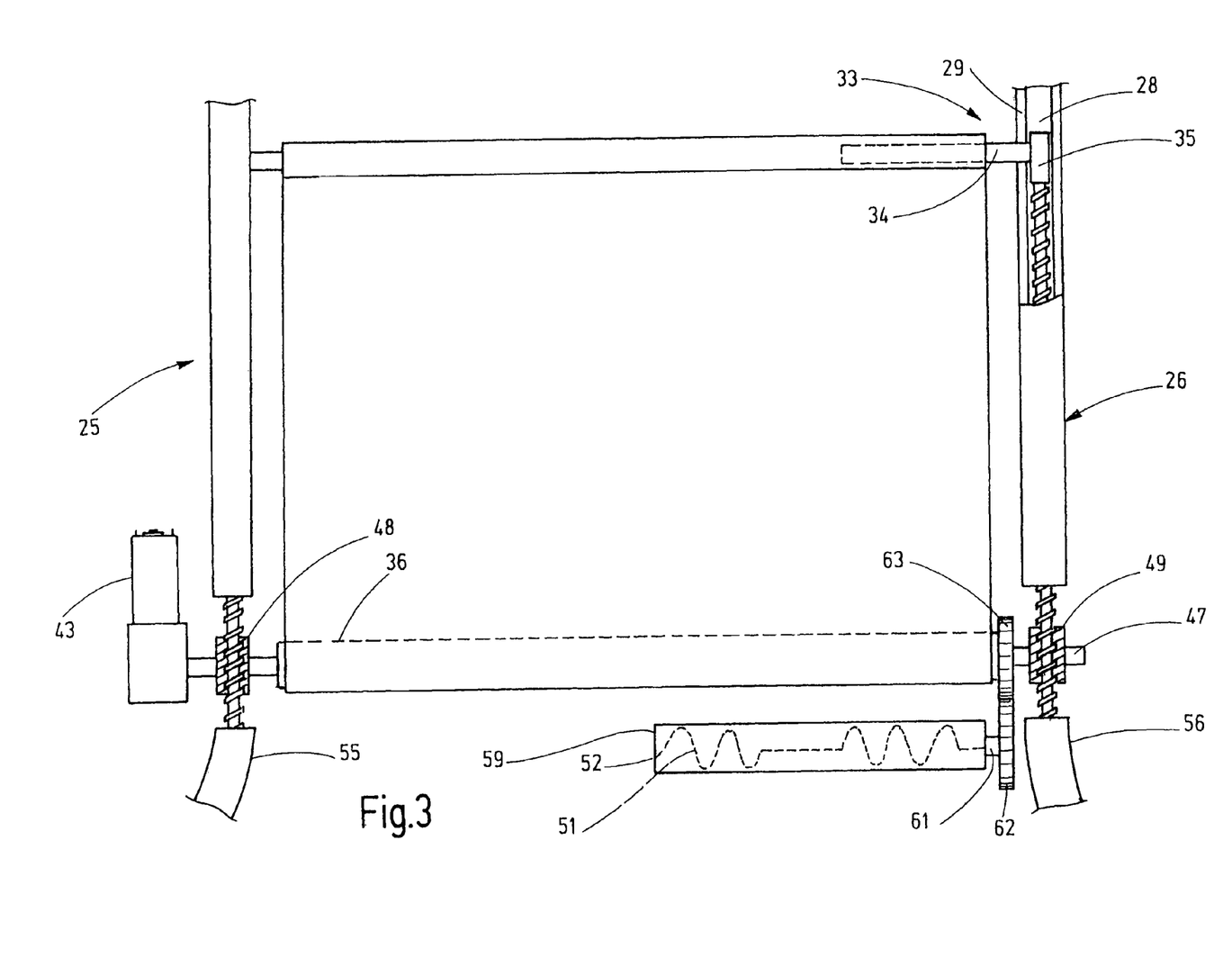
FIG. 3 is a partially cutaway front view of an alternative embodiment of a roll-up rear-window shade according to the invention in which the connection shaft runs coaxial through the wind-up shaft.

An embodiment of the roll-up window shade in which the connection shaft 47 is led coaxially through the wind-up shaft 36 is shown in FIG. 3. The spring motor 51 sits in a separate housing 59, which is fixed in the vehicle. One end of the helical spring 51 is connected, in turn, at 52 to the base of the cup-shaped housing 59, while the other end is anchored to a shaft 61. The shaft 61 carries a spur gear 62 locked in rotation. The spur gear 62 meshes with a spur gear 63 locked in rotation with the wind-up shaft 36. The gear 63 is arranged coaxial to the wind-up shaft, which incidentally is supported so that it can rotate on the connection shaft 47. The operation is the same as the roll-up shade of FIG. 2.

It will be readily apparent to those skilled in the art that the described roll-up shade construction can be used not only for roll-up rear window shades but also for roll-up side window shades or roll-up sunroof shades.

Figure 4:
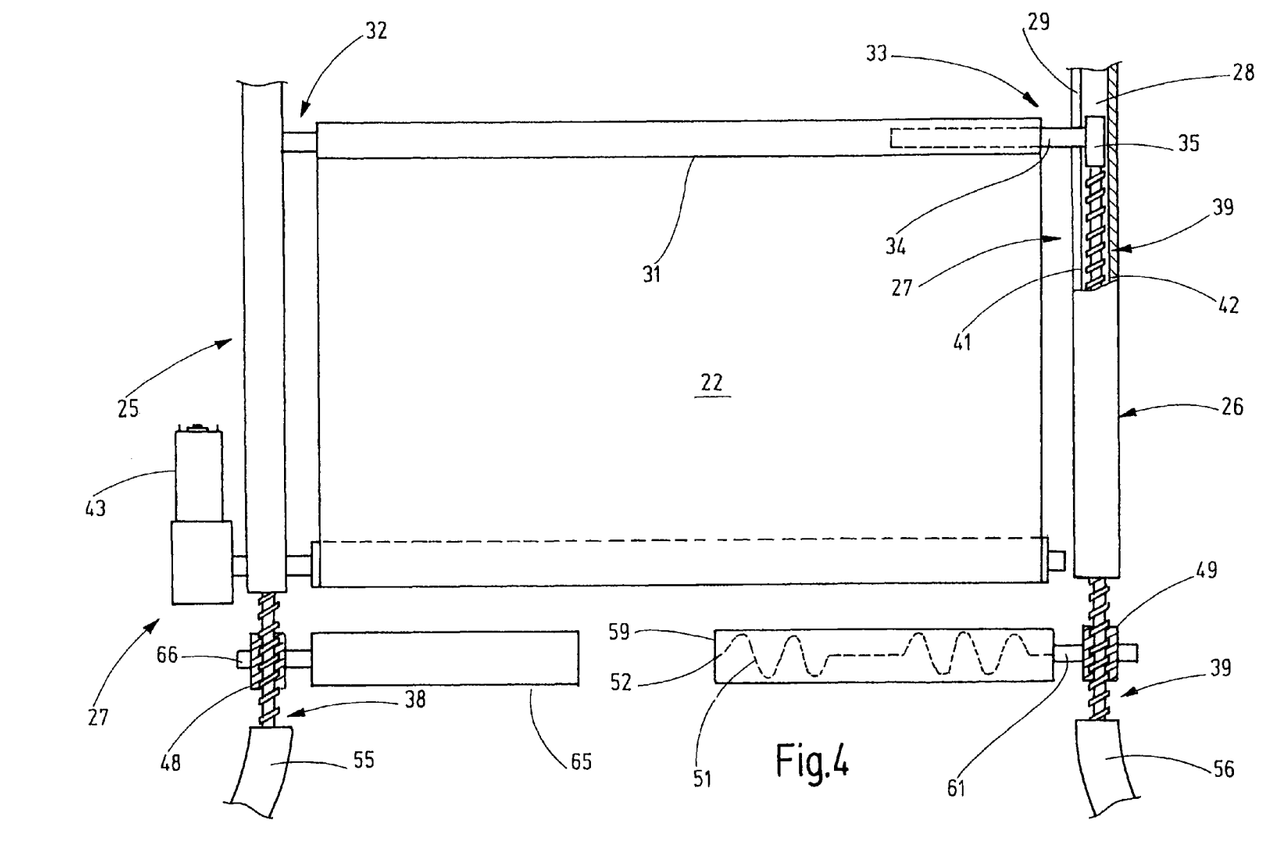
FIG. 4 is a partially cutaway front view of an alternative embodiment of a roll-up rear-window shade according to the invention with two spring motors for driving the drive gears.

If the continuous, long connection shaft 47 is interrupted, the embodiment illustrated in FIG. 4 can be used. In this embodiment, the drive gear 49 is coupled with the spring motor 51. The drive gear 49 sits on the output shaft 61 of the spring motor. The drive gear 48 is activated with the help of a spring motor 65, which has the same construction as the spring motor 5 1. The drive gear 48 sits on its output shaft 66 locked in rotation. The positive drive takes place by connecting the electrical drive motor 43 directly and in a rotationally locked manner with the wind-up shaft 36.

By setting the wind-up shaft 36 in motion, the roll-up shade can be extended. The drive gears 48, 49 under the effect of the two spring motors 51, 65 press the work section of the corresponding push element 38, 39 against the pull rod 31 and thus maintain the fabric tension. To retract the shade element, the gear motor 43 is activated with the reverse rotational direction, whereby the fabric shade 22 is forcibly wound onto the wind-up shade 36. The two push elements 38 and 39 are also forcibly pushed back against the action of the spring motors 51 and 65 into the associated storage tube 55, 56. The advantage of the FIG. 4 embodiment is that no long components are necessary apart from the wind-up shaft 36. However, the low-friction operation of the push elements remains.

Figure 5:
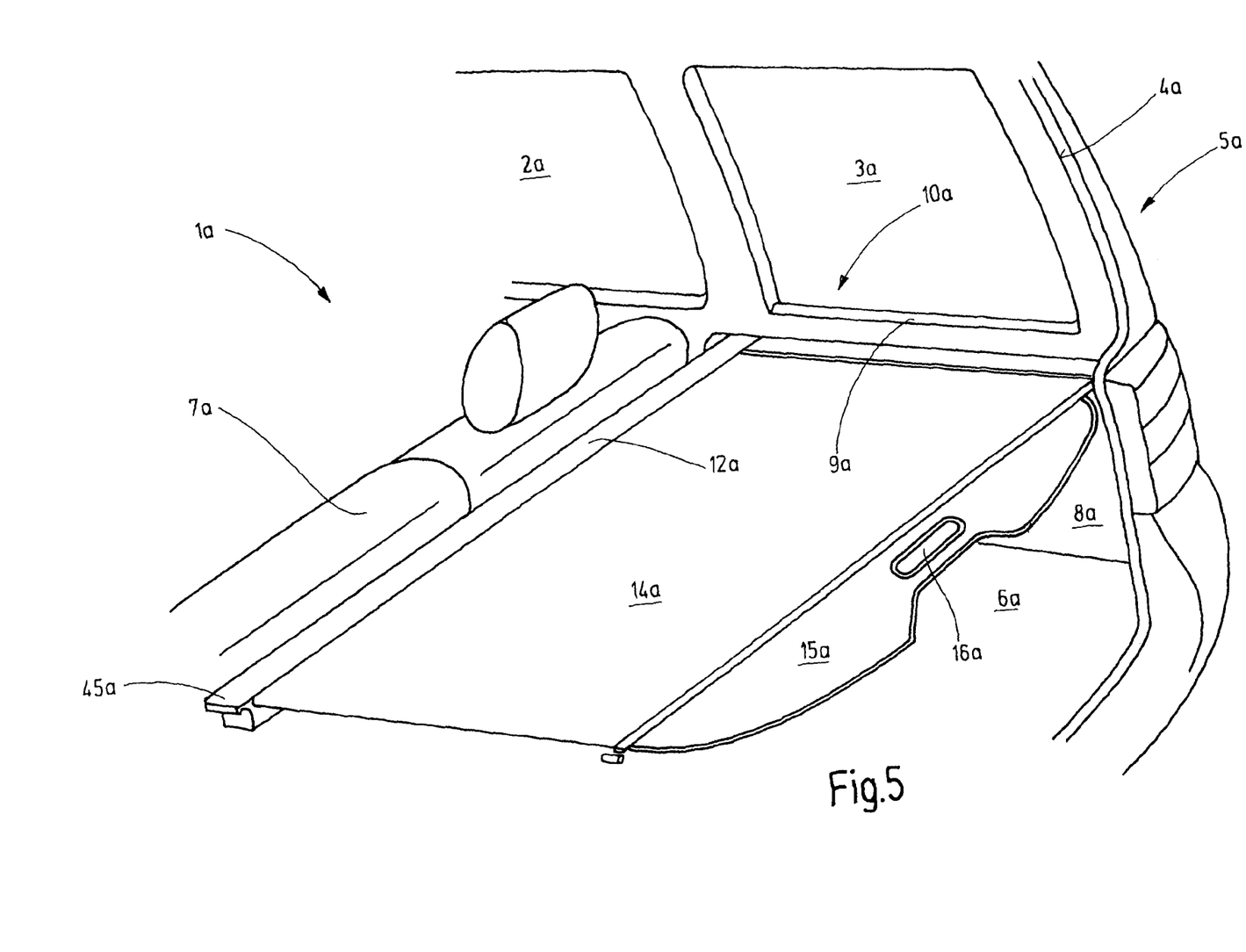
FIG. 5 is a partially cutaway perspective view of the luggage compartment of an exemplary motor vehicle equipped with a trunk cover according to the present invention.

The rear trunk compartment area of a station wagon is shown in FIG. 5. In FIG. 5, two rear right side windows 2a and 3a can be seen, as well as a part of an edge 4 and a tailgate opening 5a. A trunk space 6a, which is bounded at the front by a rear seat backrest 7a of a rear seat bench, begins at the tailgate opening 5a. At the side, the trunk space 6a is bounded by side walls 8a, which reach up to a window bottom edge 9a. The window bottom edge 9a corresponds to the height of the rear seat backrest 7a. At the top, the trunk space 6a is visually blocked by a trunk cover 10a.

The trunk cover 10a includes a removable, elongated housing 12a in which a wind-up shaft 13a (FIG. 6) is rotatably supported. One edge of a shade element 14a is fixed to the wind-up shaft 13a. The other moving end of the shade element 14a is connected to a contour part 15a. The contour part 15a is resistant to bending and contains a handle opening 16a. The outer contours of the contour part 15a are adapted to the profile of the inside of the tailgate.

Figure 6:
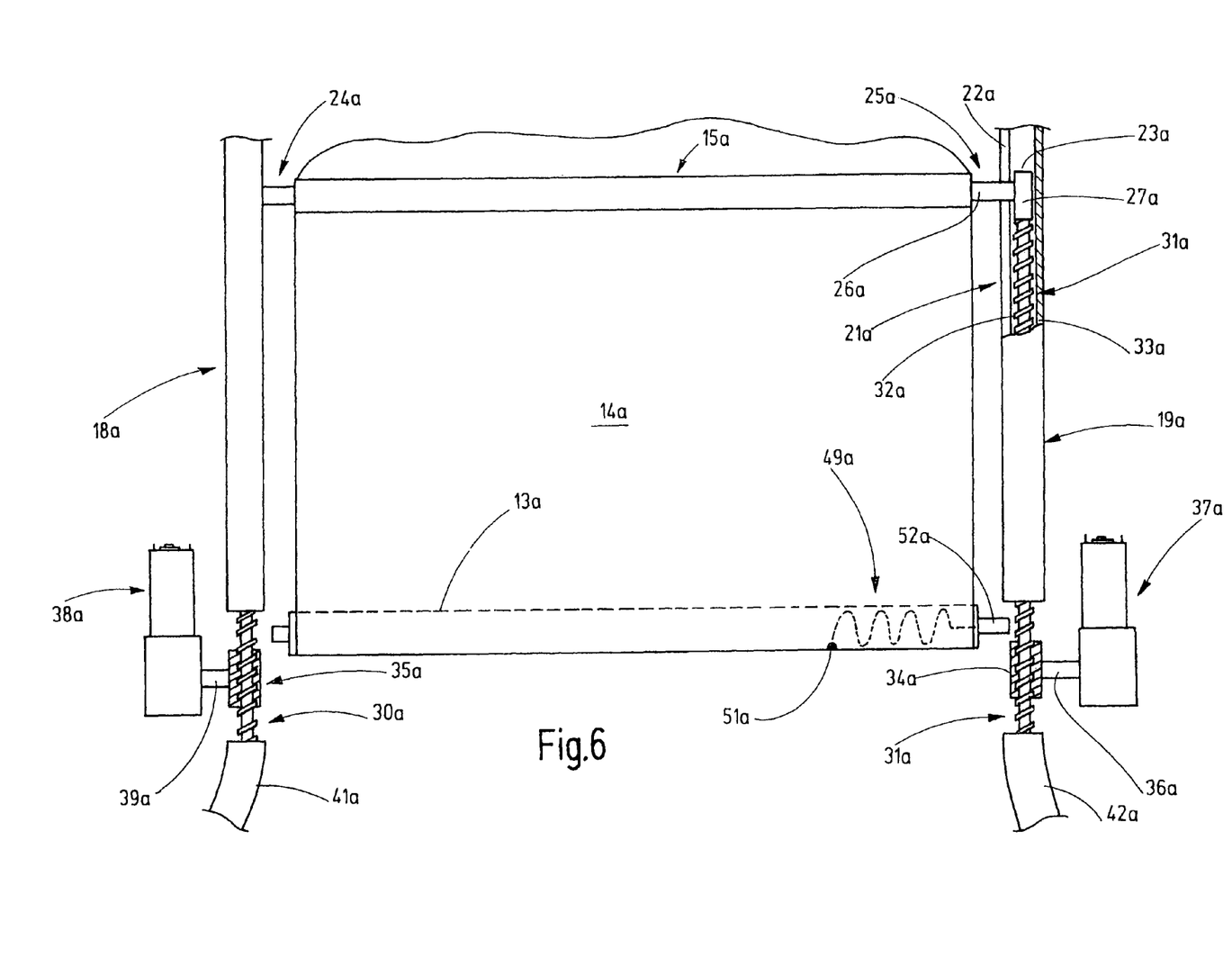
FIG. 6 is a partially cutaway plan view of the trunk cover of FIG. 5.

The trunk cover 10a is driven electrically. The drive arrangement is shown in FIG. 6. A guide rail 18a, 19a runs laterally on each side underneath the window bottom edge 9a. The two guide rails 18a and 19a are, for example, a component of a contour part that is attached in the vehicle. Each of the guide rails 18a, 19a contains a guide groove 21a. The cross section of the guide groove 21a is composed of a groove slot 22a and a groove chamber 23a. The two groove slots 22a of the two guide rails 19a, 18a point towards each other.

The guide rails 18a, 19a are used for the sliding guidance of guide pieces 24a, 25a that are connected to the contour part 15a at each position at which the contour part 15a transitions into the shade element 14a. Each guide part 25a, 24a is composed of a throat part 26a and a sliding piece 27a. The throat part 26a is dimensioned so that it fits through the groove slot 22a with play. In contrast, the sliding piece 27a is adapted to the cross section of the groove chamber 23a, i.e., it is cylindrical.

The motion of the contour part occurs with the help of two linear push elements 30a and 31a. The push elements 30a and 31a are constructed identically to each other, so it is sufficient to explain only the push element 31a in detail. It is composed from a cylindrical, elastically bendable core 32a and a coil 33a attached rigidly to this core. In this way, a kind of elastically bendable toothed rack with a circular cross section is produced, which has helical gearing all around. The coil 33a forms a type of continuous tooth. The outer diameter of the push element 31a or 30a corresponds to the open width of the groove chamber 23a and is greater than the slot width 22a. In this way it is ensured that the push element 30a or 31a is guided in a buckle-free manner in the associated guide rail 18a, 19a and can transfer compressive forces.

For driving the push element 31a, a drive gear 34a is mounted rotatably underneath the housing 12a in the motor vehicle. Another gear 35a is used for driving the push element 30a and sits somewhat underneath and in extended relation to the guide rail 18a. The drive gear 34a sits locked in rotation on an output shaft 36a of a gear motor 37a. A gear motor 38a is provided on the other side of the shade element 14a on whose output shaft 39a sits the gear 35a locked in rotation. The two drive motors 37a, 38a are fixed within the motor vehicle. They are not a component of the housing 12a and thus also are not removable.

Figure 7:
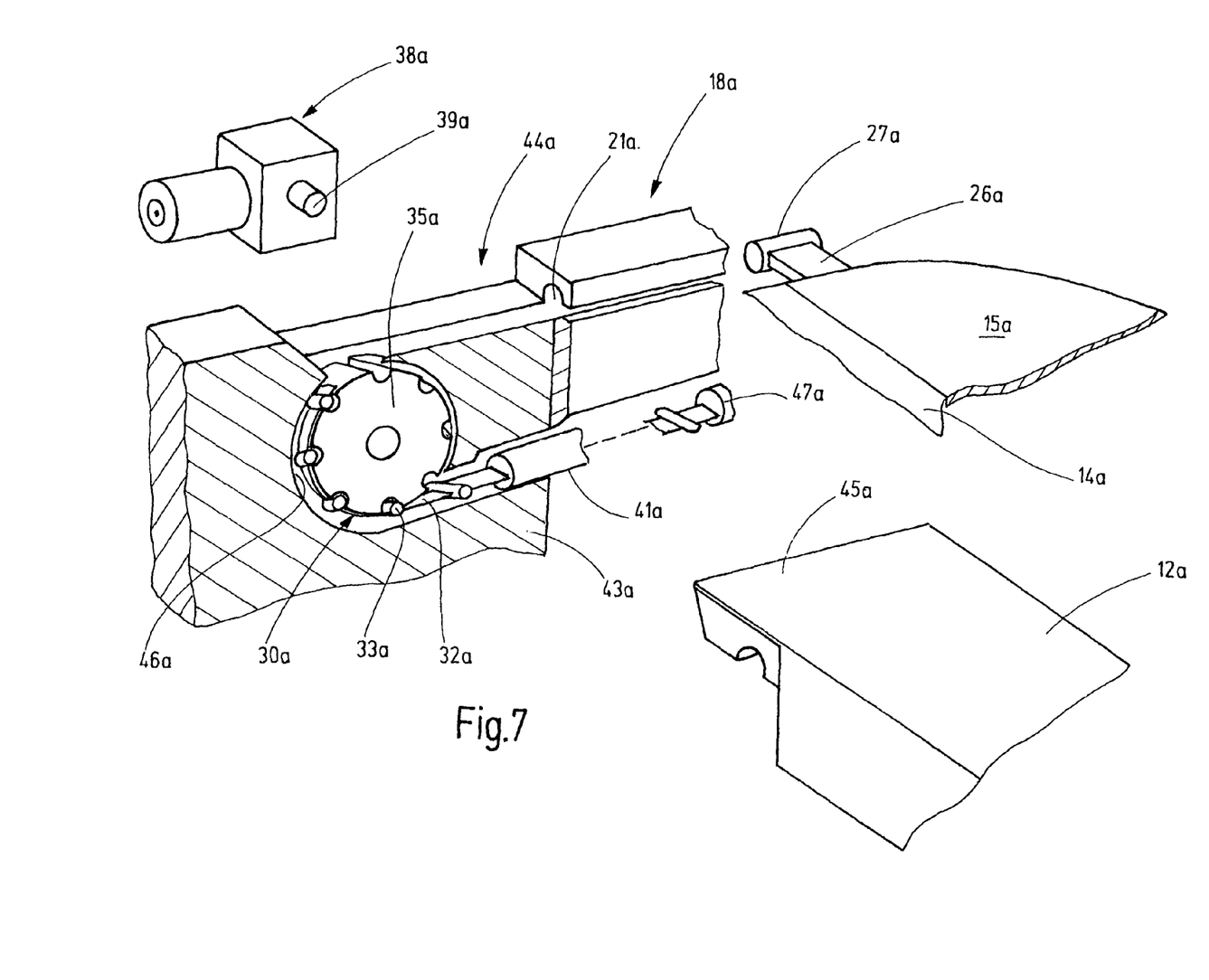
FIG. 7 is an exploded perspective view of the drive and one of the guide rails of the trunk cover of FIG. 5.

Through the two gears 34a, 35a, the associated push elements 30a, 31a are divided into a work section and a slack section. The work section runs in the corresponding guide rails 18a, 19a, while the slack section is held in the storage tubes 41a, 42a. FIG. 7 shows a portion of this arrangement. The left guide rail 18a with the guide groove 21a contained in this rail can be seen in FIG. 7. The associated storage tube 41a runs underneath the guide groove 21a. The drive gear 35a, whose rotational axis is oriented horizontally and perpendicular to the longitudinal axis of the motor vehicle, lies between the guide groove 21a and the storage tube 41a. The gear 35a is located in a gear housing 43a, which is provided on its top side with a recess 44a. The recess 44a holds a projection 45a, which is constructed on the top side on both ends of the housing 12a.

The gear housing 43a defines a guide channel 46a, which runs around the gear 35a and which has the task of forcing the push element 30a on the necessary curved profile, so that it remains positively engaged with the gearing of the gear 35a. The gear 35a contacts the front end of the corresponding guide rail 18a underneath the guide groove 21a.

In the region of the recess 44a, which lies somewhat above that of the drive gear 35a, the guide groove 21a is halved in the horizontal direction, i.e., the bottom half is located in the housing 43a while the top half is constructed on the bottom side of the projection 45a. For the housing 12a, the projection 45a and the gear housing 43a together form the complete guide groove 21a in which the push element 30a is guided protected from buckling. The drive motor 38a for driving the gear 35a is shown schematically at the top left of FIG. 7.

The storage tube 41a extends into a borehole 49a of the gear housing 43a. A positive-fit stop 47a is located at the other end of the storage tube 41a, which runs parallel to the guide groove 21a at a distance that corresponds to the outer diameter of the drive wheel 35a in addition to the diameter of the push element 30a. The construction of the opposite side is a mirror image of the side described and does not need to be explained in detail.

The fabric tension in the shade element 14a is typically generated with the help of a spring motor 49a, which sits in the interior of the tubular wind-up shaft 13a. The spring motor 49a is, for example, a helical spring, which is connected locked in rotation at 51a to the wind-up shaft 13a, while its other end is fixed to a bearing journal 52a, which sits in the housing 12a in a rotation-proof manner.

In the completely retracted position, the two guide pieces 24a, 25a lie with their sliding pieces 27a underneath the projection 45a of the housing 12a. Thus, they are located in the region of the guide groove 12a, which is divided into the housing 43a and the projection 45a. The push elements 30a and 31a assume the position shown in FIG. 7, in which they bump against the stop 47a at the end of the associated storage tube 41a or 42a. This situation is detected by measuring the current consumed by the motor 38a or 37a, with the other motor 37a, 38a being stopped.

The end of each push element 30a, 31a adjacent to the sliding piece 27a is pulled back somewhat far underneath the guide groove 21a, as shown in FIG. 7. It stands at approximately 11 o'clock if the flat side of the drive gear 35a is considered to be a clock face. In this position, a user can easily withdraw the housing 12a, together with the roll-up shade. Only part of the contour piece 15a still projects from the housing 12a.

When the housing 12a is removed, the trunk space 6a is completely open at the top. There are no parts extending crosswise over the trunk space. After folding down the rear seat backrests 7a, an uninterrupted, large loading space is available.

If the user wants to close the trunk space 6a at the top with the upright rear seat backrests 7a, he sets the housing 12a with the projections 45a into the associated receptacles 44a in the illustrated position of the push elements 30a, 31a. In this position, the housing 14a can be locked by locking mechanisms, which can be opened arbitrarily. Then the two drive motors 37a and 38a can be activated simultaneously by a switch.

Because permanently excited DC motors are involved in both cases, the drive motors run within a relatively small tolerance at nearly the same rotational speed. Consequently, the two drive gears 34a and 35a coupled with these motors also run at practically the same speed. Because the associated push element 30a, 31a engages positively with each gear, the relevant push element 30a, 31a is pulled from the storage tube 41a or 42a and is led around the drive gear 34a or 35a into the guide groove 21a of the two guide rails 18a, 19a. After a short distance of slack, each of the push elements 30a, 31a bumps against the sliding blocks 27a located in the guide groove and pushes the sliding piece 27a in front of it in the direction towards the rear opening 5a. Therefore, the contour part 15a is carried along and the shade element 14a is unwound from the wind-up shaft 13a against the action of the spring motor 49a.

When the contour part 15a has reached its end position next to the tailgate, the two sliding pieces 27a in their guide grooves 21a contact corresponding positive-fit stops. Therefore, each of the two drive motors 37a, 38a is blocked abruptly. The blocking current is measured and the current for both motors 37a, 38a is turned off independent of the switch position in order to prevent an overload.

Because both motors operate at the same rotational speed within the tolerance window, both side ends of the contour part 15a run at practically the same speed. Skewed pulling will not be observed. Even if the motors drift from each other a little in terms of rotational speed, the difference in travel is balanced by contact against the positive-fit stop. Apart from these synchronization measures, which are purely mechanically and engage only at the end of the motion travel, no other synchronization is provided. Thus, the control is significantly simplified.

In addition, relatively little friction appears in the system. The force to be applied by each motor is composed of the force necessary for overcoming the biasing force of the spring motor 49a and also the friction that the push element experiences in the deflection channel around the drive gear 35a. In connection with this, each push element can be essentially elongated and thus can run with very low friction.

The retraction or opening of the trunk cover is performed analogously in the reverse way until the starting position described above is reached. The spring motor winds the shade element onto the wind-up shaft.

A roll-up window shade for motor vehicle windows is provided that has guide rails running at the side of the extended shade element. A linear push element is provided for each guide rail. Each push element is driven by a separate gear. Therefore, complicated guide tubes, which among other problems generate a lot of friction, are eliminated.

A trunk cover has a guide rail on each side of the shade element. For driving the shade element, a push element is provided for each guide rail. The push element is constructed as a non-endless drive element. Each push element is driven by a separate motor and a separate gear. Electrical synchronization of the motors is not provided.

The invention claimed is:

1. A roll-up window shade for motor vehicles comprising:
   a rotatably supported wind-up shaft having first and second ends;
   a shade element having a first edge fixed to the wind-up shaft;
   a pull rod connected to a second edge of the shade element remote from the wind-up shaft;
   two guide rails each extending on a respective side of the shade element for guiding movement of the pull rod and shade element between a retracted position exposing a window and an extended position covering the window;
   two push elements each of which is allocated to a respective one of the guide rails, each push elements being guided through its respective guide rails, each push element carrying teeth and pushing on the pull rod;
   two drive gears each of which is allocated to a respective one of the push elements, each drive gear being fixedly mounted on an end of a connecting shaft;
   at least one spring motor coupled with the connection shaft for rotating said drive gears in a direction that moves the pull rod and shade element to said extended position; and
   an electric drive motor coupled to said wind-up shaft operable for rotating said wind-up shaft in a direction that moves said pull rod and shade element toward said retracted position.

2. The roll-up window shade according to claim 1, wherein the pull rod is configured such that the pull rod is selectively variable in length.

3. The roll-up window shade according to claim 1, wherein an end of the guide rails is arranged in the vicinity of the wind-up shaft.

4. The roll-up window shade according to claim 1, wherein the guide rails run parallel to each other.

5. The roll-up window shade according to claim 1, wherein each guide rail contains a guide groove.

6. The roll-up window shade according to claim 5, wherein the guide groove has a cross section including a groove chamber and a groove slot, a diameter of the groove chamber being greater than an open width of the slot such that an undercut guide groove is produced.

7. The roll-up window shade according to claim 6, wherein each push element is guided protected from buckling in the respective groove chamber.

8. The roll-up window shade according to claim 1, wherein each push element has teeth all around its outer surface.

9. The roll-up window shade according to claim 1, wherein each drive gear is a spur gear.

10. The roll-up window shade according to claim 1, wherein the connection shaft extends outside and parallel to the wind-up shaft.

11. The roll-up window shade according to claim 1, wherein the connection shaft extends through the wind-up shaft.

12. The roll-up window shade according to claim 1, wherein the spring motor comprises a helical or a spiral spring.

13. The roll-up window shade according to claim 1, each push element has an associated separate storage tube for holding a slack section of the respective push element when the roll-up window shade is in a retracted position.

14. The roll-up window shade according to claim 13, wherein each storage tube is made from a flexible material.

15. The roll-up window shade according to claim 1 including a respective spring motor coupled to each of said drive gears for rotating said connection shaft in a direction that moves said pull rod and shade element toward said extended position.

16. The roll-up window shade according to claim 1 in which said connection shaft includes two separate shaft segments each carrying a respective one of said drive gears, and a separate spring motor coupled to each shaft segment for simultaneously rotating said shaft segments in a direction that moves said pull rod and shade element toward said extended position.

17. The roll-up window shade according to claim 1 in which said electric drive motor is operable for rotating said wind-up shaft in a direction that allows said shade element to be unwound from said wind-up shaft under the power of said spring motor.

* * * * *